(12) United States Patent
Lu

(10) Patent No.: US 7,039,479 B1
(45) Date of Patent: May 2, 2006

(54) PRODUCTION PLANNING SYSTEM

(76) Inventor: Li-Chih Lu, No. 17 Lane 22, Sung-Bo Street, Pai-chiao, Taipei Hsien (TW)

( * ) Notice: Subject to any disclaimer, the term of this patent is extended or adjusted under 35 U.S.C. 154(b) by 0 days.

(21) Appl. No.: 11/034,688

(22) Filed: Jan. 12, 2005

(51) Int. Cl.
*G06F 19/00* (2006.01)
*G06Q 10/00* (2006.01)

(52) U.S. Cl. .......................................... 700/97; 705/28
(58) Field of Classification Search ............ 700/95–97, 700/99, 106, 107, 115, 116, 213–216; 705/7–10, 705/22, 28, 29
See application file for complete search history.

(56) References Cited

U.S. PATENT DOCUMENTS

| | | | |
|---|---|---|---|
| 5,657,453 A * | 8/1997 | Taoka et al. ................. | 705/1 |
| 6,226,561 B1 * | 5/2001 | Tamaki et al. ............... | 700/100 |
| 6,311,094 B1 * | 10/2001 | Iriuchijima et al. ......... | 700/100 |
| 6,415,195 B1 * | 7/2002 | Gleditsch et al. ............ | 700/99 |
| 6,714,947 B1 * | 3/2004 | Fa .............................. | 707/104.1 |
| 2002/0095307 A1 * | 7/2002 | Greamo et al. .............. | 705/1 |
| 2003/0050817 A1 * | 3/2003 | Cargille et al. .............. | 705/8 |
| 2003/0204463 A1 * | 10/2003 | Mitsukuni et al. ........... | 705/36 |
| 2003/0208389 A1 * | 11/2003 | Kurihara et al. ............. | 705/7 |
| 2004/0039585 A1 * | 2/2004 | Kitamura et al. ............ | 705/1 |
| 2004/0210467 A1 * | 10/2004 | Yokoyama .................. | 705/8 |
| 2005/0144055 A1 * | 6/2005 | Horlacher et al. ........... | 705/8 |

\* cited by examiner

*Primary Examiner*—Maria N. Von Buhr
(74) *Attorney, Agent, or Firm*—Sughrue Mion, PLLC; Pavel Pogodin, Esq.

(57) ABSTRACT

The production planning system of this invention comprises: a supply quantity calculation module to calculate quantities of particular components, half products and finished products to be supplied in the current cycle; a production policy database to store useful data needed in the calculation of said supply quantity; a production policy data editing module to allow modification of data stored in said production policy database; and an output means to output supply quantity calculated by said supply quantity calculation module; wherein said supply quantity is calculated from:

supply quantity=estimated consuming quantity+estimated loss quantity+predetermined stock quantity;

wherein said predetermined stock quantity is calculated from:

predetermined stock quantity=predetermined final stock quantity of current cycle−initial stock quantity of current cycle.

3 Claims, 2 Drawing Sheets

PRODUCTION PLANNING SYSTEM

FIELD OF THE INVENTION

The present invention relates to a production planning system, especially to a production system that plans stock policies and quantity of production according to actual needs in production.

BACKGROUND OF THE INVENTION

To plan and administrate the production activities of a company using the high speed calculation capabilities of the computer system has been a popular application in the industry. In the conventional production planning system, the high speed calculation capabilities of the computer system are used to administrate large quantity of components, half products and finished products to be used in production. For example, a company that produces 20 different products may need to use tens of thousand of components, if each product is made of 1,000 components. For that company, there would be several dozens of finished products and half products to be managed. The conventional automated production planning system is used to manage the stocks of these components, half products and finished products.

In the conventional art, the management of production is established on the consuming quantity of components, half products and finished products. In other words, in the conventional technology production activities are planned and administrated according to the consuming quantity or estimated consuming quantity of particular components, half products and finished products. The purpose of the conventional production planning system is to make the production or procurement of components, half products or finished product to meet the sales or production activities of a company, such that shortage or waste in stocks may be avoided. Under such a purpose, the conventional production planning may be represented by the following formula:

$$\text{quantity to be supplied} = \text{required quantity} + \text{safety stock} - \text{current stock} \quad (1)$$

wherein required quantity represents estimated quantity of components/products to be consumed within the current period, such as current month, and includes quantity of components/products for production, for maintenance, for sale etc.; safety stock represents quantity of components/products reserved for emergency according to particular company policies; and current stock represents quantity of components/products current in stock.

In the conventional technology, it is possible to generate plans for production according to estimated consuming quantity of components, half products and finished products. However, it is difficult to apply such systems to the production activities of a company with a variety of products made of tens of thousand of components and half products. For example, for every company there are "high seasons" and "low seasons". For particular products, there could be almost no sales activities during the low seasons. On the other hand, during the high season it is almost impossible to produce enough quantity of product to meet the needs of the market, no matter how production capability is squeezed. Under such circumstance, it is possible to use the conventional production planning system to administrate the production activities during the low seasons but when the high season is close, it is necessary to conduct complicated planning for the production activities for respective components, half products and finished products. Such "production activities" shall include procurement, subcontractor production and self production, assembly, packaging, shipment, warehousing etc. Although calculations in the planning stage is not difficult, if the computer system is used, the execution of the plans so generated, however, is a difficult task for stuffs in procurement, production and warehousing departments to achieve.

In addition, the production plans as generated by the conventional production planning system can only function as reference in the management of the production. They can not be used in the production system directly or even input into the production management system directly.

It is thus necessary to provide a novel production planning system that can manage the production activities of components, half products and finished products according to correct planning of production of components, half products and finished products.

It is also necessary to provide a production planning system allowing an enterprise to conduct production planning according to corrects stock policies.

It is also necessary to provide a production planning system to provide property production planning regardless of low seasons and high seasons.

It is also necessary to provide a production system wherein results of calculation may be used by applicable automatic management system.

SUMMARY OF THE INVENTION

According to the production planning system of the present invention, quantity of production and consumption of components, half products and finished products is included as considered factors in the production planning, so that production plans so generated may satisfy the actual needs of all related departments of the entity in which the production activities as planed is involved. The production planning system of this invention comprises: a supply quantity calculation module to calculate quantities of particular components, half products and finished products to be supplied in the current cycle; a production policy database to store a variety of data needed in the calculation of said supply quantity, including estimated current and long term quantities of consumption, loss and stock; a production policy data editing module to allow input of or to automatically obtain useful data and to modify data stored in said production policy database; and an output means to output supply quantity of particular components, half products and finished products of current cycle to be used for production, procurement and/or management;

wherein said supply quantity calculation module calculates said supply quantity according to the following formula:

$$\text{supply quantity} = \text{estimated consuming quantity} + \text{estimated loss quantity} + \text{predetermined stock quantity} \quad (2);$$

wherein said supply quantity pertains to quantity of particular components, half products and finished products to be added in said current cycle; said estimated consuming quantity pertains to estimated quantity of particular components, half products and finished products to be used in sales, maintenance, internal use and production in said current cycle; said estimated loss quantity pertains to estimated quantity of loss of particular components, half products and finished products during production, transportation, storage and display in said current cycle; and said predetermined stock quantity is calculated according to the following formula:

$$\text{predetermined stock quantity} = \text{predetermined final stock quantity of current cycle} - \text{initial stock quantity of current cycle} \quad (3)$$

wherein said predetermined final stock quantity of current cycle pertains to stock quantity of particular components, half products and finished products at end of said current cycle and said initial stock quantity of current cycle pertains to stock quantity of particular components, half products and finished products at initial of said current cycle.

These and other objectives and advantages of this invention may be clearly understood from the detailed description by referring to the following drawings.

DETAILED DESCRIPTION OF THE INVENTION

Although it is not intended to limit the scope of this invention, it has been found that the purpose of a production planning system shall include planning of the procurement, production, assembly and consumption of components, half products and finished products to be planned. As a result, a useful production planning system shall be able to include all these factors into consideration, so to avoid difficulties in the execution of related management policies. In order to make the production policies as planned to comply with the needs of related departments of the entity wherein the production planning is involved, not just the needs of the production planning department, a "predetermined final stock quantity" is introduced to the production planning system, to replace the "safety stock quantity" of the conventional technology.

Figure 1:
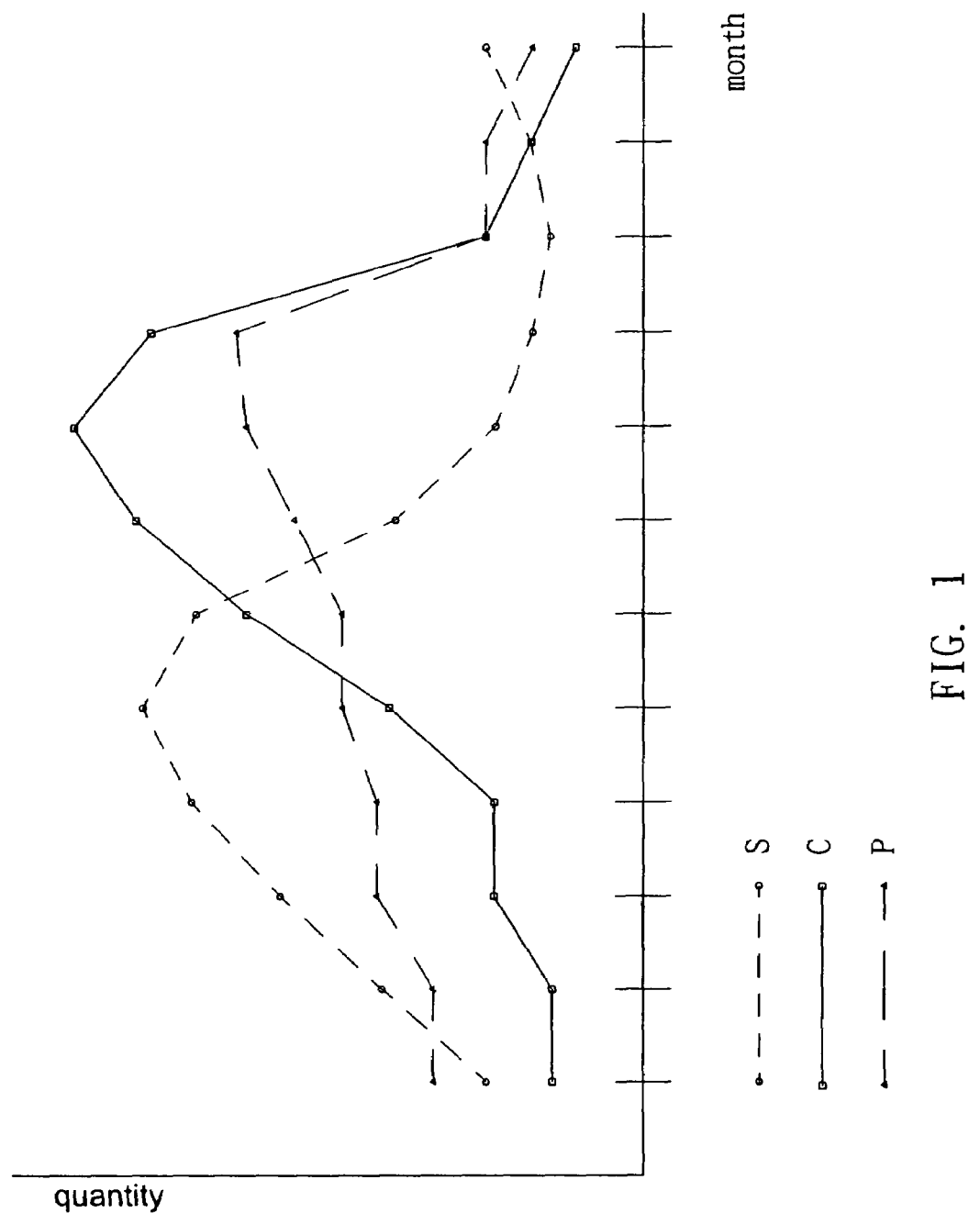
FIG. 1 shows quantities of stock, consumption and supply of components, half products or finished products, as generated by the production planning system of this invention.

FIG. 1 shows quantities of stock, consumption and supply of components, half products or finished products, as generated by the production planning system of this invention. As shown in this figure, the horizontal axis represents time, wherein the 12 months of a year are shown. The vertical axis represents quantity or components, half products or finished products. In the following description, a production cycle or a production planning cycle will be one month. Of course, any other time period may be used as a production cycle or production planning cycle in this invention.

In FIG. 1, curve S represents final stock quantity, which pertains to stock quantity of particular components, half products and finished products at end of a cycle. This quantity is also initial stock quantity of the following cycle. Curve C represents consuming quantity of a cycle, which denotes to quantity consumed in production, sales, maintenance, internal use etc. Curve P represents supply quantity of a cycle, which denotes to quantity of particular components, half products and finished products as added in one cycle. The added quantity may come from procurement, production, assembly etc. This figure also shows that months 4–7 are high season and the rest months are low season. A significant difference in consuming quantity is also shown in this figure. Stock quantity S varies with the variation of the consumption quantity C, whereby predetermined stock quantities are maintained at certain levels. However, according to this invention, a useful production planning system shall be able to maintain a stable supplying quantity so that the supplying quantity won't vary significantly following the consumption quantities of the low season and the high season.

In order to achieve the above objectives, in the present invention production planning is controlled based on the "predetermined final stock quantity" of corresponding cycle, such that supply quantity of components, half products and finished products will maintain substantially stable.

Figure 2:
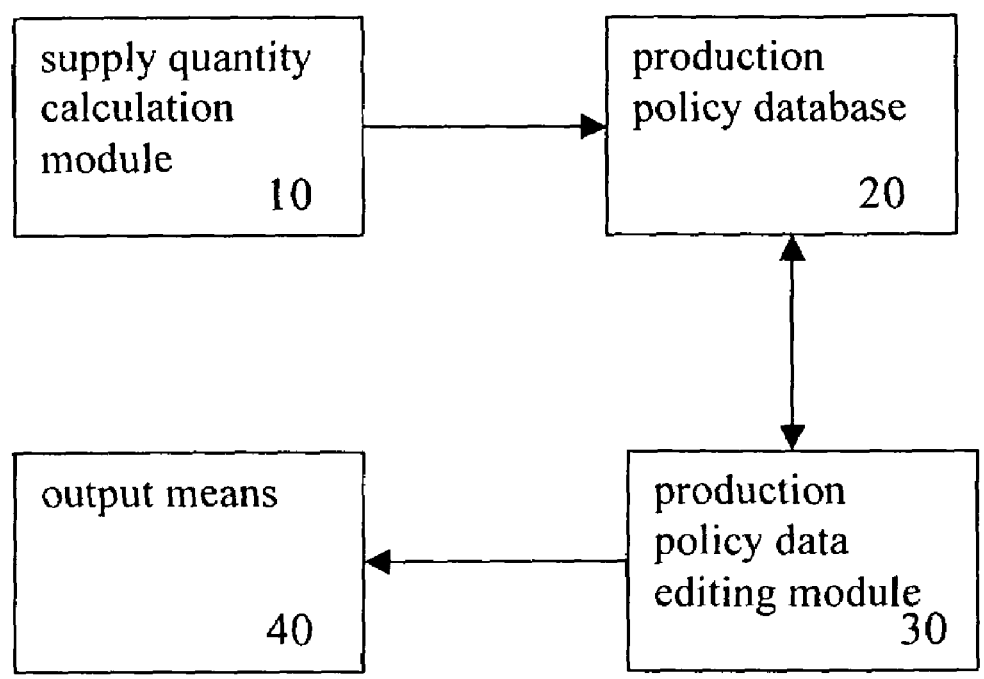
FIG. 2 illustrates the systematic diagram of the production planning system of this invention.

FIG. 2 illustrates the systematic diagram of the production planning system of this invention. As shown in this figure, the production planning system of this invention comprises: a supply quantity calculation module 10 to calculate quantities of particular components, half products and finished products to be supplied in the current cycle; a production policy database 20 to store a variety of data needed in the calculation of said supply quantity, including estimated current and long term quantities of consumption, loss and stock; a production policy data editing module 30 to allow input of or to automatically obtain useful data and to modify data stored in said production policy database 20; and an output means 40 to output supply quantity of particular components, half products and finished products of current cycle as calculated by said supply quantity calculation module 10;

wherein said supply quantity calculation module 10 calculates said supply quantity according to the following formula:

$$\text{supply quantity} = \text{estimated consuming quantity} + \text{estimated loss quantity} + \text{predetermined stock quantity} \quad (2);$$

wherein said supply quantity pertains to quantity of particular components, half products and finished products to be added in said current cycle; said estimated consuming quantity pertains to estimated quantity of particular components, half products and finished products to be used in sales, maintenance, internal use and production in said current cycle; said estimated loss quantity pertains to estimated quantity of loss of particular components, half products and finished products during production, transportation, storage and display in said current cycle; and said predetermined stock quantity is calculated according to the following formula:

$$\text{predetermined stock quantity} = \text{predetermined final stock quantity of current cycle} - \text{initial stock quantity of current cycle} \quad (3)$$

wherein said predetermined final stock quantity of current cycle pertains to stock quantity of particular components, half products and finished products at end of said current cycle and said initial stock quantity of current cycle pertains to stock quantity of particular components, half products and finished products at initial of said current cycle.

Data needed in the calculation of the estimated supply quantity may be stored in the production policy database 20, such that the supply quantity calculation module 10 may use the data to calculate. These data include:

Estimated consumption quantity: The estimated consumption quantity is a predicted quantity, denoting to quantity of consumption of particular components, half products and finished products in particular cycles. This quantity may be calculated according to several factors, such as statistic and analytic data pertaining to quantity of particular components, half products and finished products consumed in particular cycles, such as months, of the year in sales, maintenance, internal use and production, and predictive data regarding economic development etc. For any enterprise, to correctly estimate possible consumption quantity of particular cycles has been a standard practice. In addition, in the production policy database 30, useful data may be provided.

The production policy database 30 allows users to input useful data, including correction or modification data or correction or modification factors. The production policy database 30 may also provide an automated data generating tool (not shown) to automatically obtain useful data from external systems such as the automatic production management system, shipping management system etc. of the enterprise and to automatically modify particular data and factors in the production policy database 30. The estimated consumption quantity of particular components, half products and finished products may be modified along with the modification of estimated consumption quantity of other components, half products or finished products. By using a formula, linkages in the modification of estimated consumption quantities may be established.

Estimated loss quantity: The estimated loss quantity as used in this invention may be obtained from statistic data generated for historical records. In order to generate such data, loss quantity of every component, half product and finished product in each cycle is recorded and analyzed. Data so generated can thus comply with actual loss quantities and may be used in the production planning directly.

Predetermined stock quantity: The predetermined stock quantity is calculated from the predetermined final stock quantity of a cycle and the initial stock quantity of that cycle. Such quantity represents quantity of components, half products and finished products that should be kept in stock at end of that cycle. This quantity differs from the conventional safe stock quantity in that the safe stock quantity is determined to meet urgent needs but the predetermined stock quantity is determined according to a long term plan. In the calculation of the predetermined stock quantity, an adjustment factor may be added so to dynamically adjust the stock quantity.

Predetermined final stock quantity: The predetermined final stock quantity of a cycle denotes to a planned quantity of stocked components, half products and finished products to be preserved for planned future use. In the embodiment of this invention, such predetermined final stock quantity is determined taking into consideration the long term needs of the corresponding components, half products and finished products. For example, if a large quantity is needed in a future high season, the predetermined final stock quantity of the previous cycles (e.g. months) may be properly increased, such that products to be consumed in the high season may be produced without significantly increasing the supply quantity of cycles of the high season. No need to say that the predetermined stock quantity in the cycles of high season shall be decreased, in order to consume the preserved quantity in the low season. As a result, in the later cycles of the high season and the earlier cycles of the low season, the predetermined stock quantity is approximately equal to the conventional safe stock quantity.

In the production policy database 20 data or calculation formulas of predetermined stock quantity of respective components, half products and finished products in respective cycles are stored, so that the supply quantity calculation module 10 may use them to calculate. When demands of particular products rapidly vary, such data or formulas may be revised through the production policy data editing module 30. It is also possible to design in a manner that the production policy data editing module 30 automatically obtains useful data and modifies such data or formulas. The predetermined stock quantity generated from this invention is helpful to maintain the supply curve of an enterprise stable, as shown in FIG. 1. The supply curves of respective components, half products and finished products won't swing dramatically between cycles due to changes between high season and low season, as will in the conventional art.

Initial stock quantity: The initial stock quantity denotes to quantity of particular components, half products and finished products actually in stock at the beginning of the current cycle. Such quantity is standard information in any enterprise and may be stored in the production policy database 20 for use.

The supply quantity calculation module 10 of this invention calculates the supply quantity of particular components, half products and finished products according to the above-described formulas using the related factors and data. The obtained data are then output by the output means 40, to be used or referenced by the production, procurement and/or management departments of the enterprise. Based on such data, the production department may arrange production of particular components, half products and finished products, the procurement department may arrange its purchasing activities and the management department may monitor or trace related activities of the enterprise. As material data used in the calculation of the supply quantity are detailed and correct, the supply quantity so obtained may be used as bases of production plan, procurement plan and management. Such data may also be input into relative management system directly. These features never exist in the conventional production planning system.

In the present invention, the predetermined final stock quantity is determined according to long term planning based on past experience and future forecast. Users of this invention may determine according to trade offs of forecasts of long term demands of particular products and risks in keeping stocks. For example, in order to release extensive burdens of production and assembly in high seasons, the predetermined stock quantities may be increased from an earlier cycle. On the other hand, in order to avoid higher risk, the predetermined stock quantity may be increased from a closer cycle. In addition, the predetermined final stock quantity may also be modified through the production policy data editing module 30. Dynamic production planning may thus be realized.

As the present invention has been shown and described with reference to preferred embodiments thereof, those skilled in the art will recognize that the above and other changes may be made therein without departing form the spirit and scope of the invention.

What is claimed is:

1. A production planning system, comprising:
   a supply quantity calculation module to calculate quantities of particular components, half products and finished products to be supplied in the current cycle;
   a production policy database to store a variety of data needed in the calculation of said supply quantity, including estimated current and long term quantities of consumption, loss and stock;
   a production policy data editing module to allow input of or to automatically obtain useful data and to modify data stored in said production policy database; and an output means to output supply quantity of particular components, half products and finished products of current cycle, as generated by said supply quantity calculation module;

wherein said supply quantity calculation module calculates said supply quantity according to the following formula:

supply quantity=estimated consuming quantity+estimated loss quantity+predetermined stock quantity;

wherein:

said supply quantity pertains to quantity of particular components, half products and finished products to be added in said current cycle;

said estimated consuming quantity pertains to estimated quantity of particular components, half products and finished products to be used in sales, maintenance, internal use and production in said current cycle;

said estimated loss quantity pertains to estimated quantity of loss of particular components, half products and finished products during production, transportation, storage and display in said current cycle; and said predetermined stock quantity is calculated according to the following formula:

predetermined stock quantity=predetermined final stock quantity of current cycle−initial stock quantity of current cycle (3)

wherein said predetermined final stock quantity of current cycle pertains to stock quantity of particular components, half products and finished products at end of said current cycle and said initial stock quantity of current cycle pertains to stock quantity of particular components, half products and finished products at initial of said current cycle.

2. The production planning system according to claim 1, wherein said estimated consuming quantity comprises quantity obtained from statistics of past consuming quantity and said estimated loss quantity comprises quantity obtained from statistics of past loss quantity.

3. The production planning system according to claim 1, wherein said predetermined final stock quantity comprises quantity determined according to a long term stock policy.

* * * * *